(12) United States Patent
Song et al.

(10) Patent No.: US 11,758,107 B2
(45) Date of Patent: Sep. 12, 2023

(54) METHOD OF PROVIDING ADAPTIVE AUGMENTED REALITY STREAMING AND APPARATUS PERFORMING THE METHOD

(71) Applicants: SAMSUNG ELECTRONICS CO., LTD., Suwon-si (KR); POSTECH Research and Business Development Foundation, Pohang-si (KR)

(72) Inventors: Hwangjun Song, Pohang-si (KR); Hyunmin Noh, Pohang-si (KR)

(73) Assignees: Samsung Electronics Co., Ltd., Suwon-si (KR); POSTECH Research and Business Development Foundation, Pohang-si (KR)

( * ) Notice: Subject to any disclaimer, the term of this patent is extended or adjusted under 35 U.S.C. 154(b) by 128 days.

(21) Appl. No.: 17/236,038

(22) Filed: Apr. 21, 2021

(65) Prior Publication Data

US 2022/0182596 A1 Jun. 9, 2022

(30) Foreign Application Priority Data

Dec. 3, 2020 (KR) .................. 10-2020-0167696

(51) Int. Cl.
| | |
|---|---|
| H04N 13/194 | (2018.01) |
| G06T 19/00 | (2011.01) |
| G06T 7/73 | (2017.01) |
| G06T 17/20 | (2006.01) |
| H04N 13/178 | (2018.01) |
| G06T 15/00 | (2011.01) |

(52) U.S. Cl.
CPC ............ *H04N 13/194* (2018.05); *G06T 7/73* (2017.01); *G06T 15/005* (2013.01); *G06T 17/20* (2013.01); *G06T 19/006* (2013.01); *H04N 13/178* (2018.05); *G06T 2207/30204* (2013.01); *G06T 2210/36* (2013.01)

(58) Field of Classification Search
CPC ..... G06T 15/005; G06T 17/20; G06T 19/006; G06T 2207/30204; G06T 2210/36; G06T 7/73; H04N 13/178; H04N 13/194
See application file for complete search history.

(56) References Cited

U.S. PATENT DOCUMENTS

| | | | |
|---|---|---|---|
| 8,947,431 B2 * | 2/2015 | Li ................. | A63F 13/358 |
| | | | 345/428 |
| 10,002,442 B1 * | 6/2018 | Dagley ............... | G06T 7/73 |
| 10,026,226 B1 * | 7/2018 | Lotto ................. | G06T 19/006 |
| 10,192,353 B1 | 1/2019 | Chou et al. | |

(Continued)

FOREIGN PATENT DOCUMENTS

| | | |
|---|---|---|
| KR | 2000-0028583 A | 5/2000 |
| KR | 10-1548501 | 9/2015 |

(Continued)

*Primary Examiner* — Peter D Le
(74) *Attorney, Agent, or Firm* — NSIP Law

(57) ABSTRACT

A method of providing adaptive augmented reality (AR) streaming and an apparatus performing the method are disclosed. An AR streaming method includes identifying an AR content to be displayed, obtaining a metafile corresponding to the AR content, extracting information of chunks to render the AR content from the metafile, requesting the chunks based on the information, receiving the requested chunks, and rendering the AR content based on the received chunks.

20 Claims, 8 Drawing Sheets

(56) References Cited

U.S. PATENT DOCUMENTS

| | | | |
|---|---|---|---|
| 10,491,711 B2* | 11/2019 | Hancock | G06F 3/013 |
| 10,594,757 B1* | 3/2020 | Shevchenko | G06F 40/35 |
| 10,607,567 B1 | 3/2020 | Schritter et al. | |
| 10,628,185 B1* | 4/2020 | Gupta | G06F 3/0481 |
| 11,069,094 B1* | 7/2021 | Evangelista | G06T 11/60 |
| 11,069,145 B1* | 7/2021 | Pearson | G06T 19/006 |
| 11,093,123 B1* | 8/2021 | Rossi | G06F 3/147 |
| 11,127,223 B1* | 9/2021 | Bhushan | G06T 17/20 |
| 11,412,011 B1* | 8/2022 | Benjamin | H04L 67/52 |
| 11,430,211 B1* | 8/2022 | Tiutiunnik | G06N 3/02 |
| 2007/0292049 A1* | 12/2007 | Liu | G06V 40/171 |
| | | | 382/299 |
| 2008/0069458 A1* | 3/2008 | Vega-Higuera | G06T 15/08 |
| | | | 382/232 |
| 2009/0327510 A1 | 12/2009 | Edelman et al. | |
| 2011/0137561 A1* | 6/2011 | Kankainen | G09B 29/007 |
| | | | 701/300 |
| 2011/0141141 A1* | 6/2011 | Kankainen | H04N 5/272 |
| | | | 348/E7.001 |
| 2012/0277571 A1* | 11/2012 | Cho | A61B 5/055 |
| | | | 600/410 |
| 2013/0315311 A1* | 11/2013 | Song | H04N 19/105 |
| | | | 375/240.16 |
| 2014/0198097 A1* | 7/2014 | Evans | G06T 17/00 |
| | | | 345/419 |
| 2014/0300775 A1* | 10/2014 | Fan | G06T 19/006 |
| | | | 348/222.1 |
| 2015/0071075 A1 | 3/2015 | Ramakrishnan | |
| 2015/0161822 A1* | 6/2015 | Basu | G06T 19/006 |
| | | | 345/633 |
| 2015/0206348 A1* | 7/2015 | Koreeda | H04N 5/265 |
| | | | 345/633 |
| 2015/0206350 A1* | 7/2015 | Gardes | H04N 21/4316 |
| | | | 345/619 |
| 2015/0221133 A1* | 8/2015 | Groten | G06T 11/00 |
| | | | 345/633 |
| 2015/0262428 A1* | 9/2015 | Tatzgern | G06F 3/017 |
| | | | 345/633 |
| 2016/0140761 A1* | 5/2016 | Saunders | G06T 17/20 |
| | | | 345/633 |
| 2016/0147492 A1* | 5/2016 | Fugate | G06F 3/1423 |
| | | | 345/633 |
| 2016/0182940 A1* | 6/2016 | Assayag | H04N 21/6131 |
| | | | 725/62 |
| 2016/0240004 A1* | 8/2016 | Ur | G06T 19/20 |
| 2016/0307371 A1* | 10/2016 | Ayers | H04N 21/816 |
| 2016/0350609 A1* | 12/2016 | Mason | G06T 15/20 |
| 2017/0150139 A1* | 5/2017 | Lee | G06F 3/03547 |
| 2017/0264833 A1* | 9/2017 | Barnes | H04N 5/23206 |
| 2017/0301140 A1* | 10/2017 | Smith | G06T 1/20 |
| 2017/0323449 A1* | 11/2017 | Aonuma | G06T 19/006 |
| 2018/0089899 A1 | 3/2018 | Piemonte et al. | |
| 2018/0091572 A1 | 3/2018 | Begen et al. | |
| 2018/0101966 A1* | 4/2018 | Lee | G06T 7/75 |
| 2018/0350134 A1* | 12/2018 | Lodato | G06T 15/20 |
| 2019/0035153 A1* | 1/2019 | Dange | G06V 40/161 |
| 2019/0052913 A1* | 2/2019 | Hachfeld | H04N 19/184 |
| 2019/0094552 A1* | 3/2019 | Shousha | G02B 27/0179 |
| 2019/0130649 A1* | 5/2019 | O'Brien | G06Q 30/0643 |
| 2019/0149819 A1* | 5/2019 | Phillips | H04N 19/46 |
| | | | 375/240.02 |
| 2019/0179405 A1* | 6/2019 | Sun | G06F 1/1686 |
| 2019/0355170 A1* | 11/2019 | Chen | G06F 3/147 |
| 2020/0090417 A1* | 3/2020 | Schloter | G06T 7/33 |
| 2020/0137133 A1 | 4/2020 | Halepovic et al. | |
| 2020/0219285 A1* | 7/2020 | Faramarzi | H04N 19/117 |
| 2020/0265552 A1* | 8/2020 | Hemmer | G06T 17/205 |
| 2020/0265611 A1* | 8/2020 | Hemmer | G06T 17/205 |
| 2020/0312029 A1* | 10/2020 | Heinen | G06T 19/006 |
| 2020/0389493 A1* | 12/2020 | Vannoni | G06F 16/972 |
| 2020/0402261 A1* | 12/2020 | Hemmer | G06T 9/001 |
| 2022/0150557 A1* | 5/2022 | Denoual | H04N 21/2358 |

FOREIGN PATENT DOCUMENTS

| | | |
|---|---|---|
| KR | 10-2020-0073784 A | 6/2020 |
| KR | 10-2020-0077974 A | 7/2020 |

* cited by examiner

METHOD OF PROVIDING ADAPTIVE AUGMENTED REALITY STREAMING AND APPARATUS PERFORMING THE METHOD

CROSS-REFERENCE TO RELATED APPLICATION(S)

This application claims the benefit under 35 USC § 119(a) of Korean Patent Application No. 10-2020-0167696 filed on Dec. 3, 2020, in the Korean Intellectual Property Office, the entire disclosure of which is incorporated herein by reference, for all purposes.

BACKGROUND

1. Field

The following description relates to a method of providing adaptive augmented reality (AR) streaming, and an apparatus that performs the method.

2. Description of Related Art

Augmented Reality (AR) may be an interaction of a real environment in which an object in a real world is augmented by computer-generated sensory information which may involve multisensory modalities including a visual sense, an auditory sense, a somatic sense, and an olfactory sense. AR may be defined as a system that satisfies three basic functions—combination of a real world and a virtual world, real-time interaction, and accurate three-dimensional (3D) matching of real and virtual objects.

An AR streaming service may be implemented by combining a device that performs functions such as motion tracking, environment recognition, and light source estimation, and a library that shares AR contents and provides a user device with the contents. That is, a user device may receive an AR content in real time from an online library in a cloud server, and provide a user with AR streaming.

However, according to typical AR streaming technology, AR contents that is suitable for a network state may not be provided, and thus delay-based transmission of AR contents may not be available in the case of a limited network state.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an augmented reality (AR) streaming method includes identifying an AR content to be displayed; obtaining a metafile corresponding to the AR content; extracting, from the metafile, information of chunks to render the AR content; requesting the chunks based on the extracted information of the chunks; receiving the requested chunks; and rendering the AR content based on the received chunks.

The identifying of the AR content may include detecting a marker in a captured image; recognizing a uniform resource locator (URL) of the AR content based on an identifier of the detected marker; and determining a position and a size at and by which the AR content is to be displayed based on a position of the detected marker and a size of the detected marker.

The requesting of the chunks includes requesting the chunks that increase a streaming quality of the AR content based on the extracted information.

The information may include quality information that is based on a size of the AR content and a level of detail (LOD), and a data size of the chunks.

The quality information may be a mean squared error (MSE) of an image that is rendered at an LOD of the chunks compared to an image that is rendered at a highest LOD.

The requesting of the chunks may include determining the chunks to be requested based on the quality information, the data size, and a weight of the AR content.

The weight of the AR content may be determined based on a size by which the AR content is to be displayed.

The rendering of the AR content may include rendering the AR content by combining the requested chunks with a previously received chunk.

In a general aspect, an augmented reality (AR) streaming apparatus includes a memory comprising instructions; and a processor, configured to execute the instructions, wherein, when the instructions are executed by the processor, the processor is configured to: identify an AR content to be displayed; obtain a metafile corresponding to the AR content; extract, from the metafile, information of chunks to render the AR content; request the chunks based on the information of the chunks; receive the requested chunks; and render the AR content based on the received chunks.

The processor may be configured to: detect a marker in a captured image; recognize a uniform resource locator (URL) of the AR content based on an identifier of the detected marker; and determine a position and a size at and by which the AR content is to be displayed based on a position of the detected marker and a size of the detected marker.

The processor may be configured to request the chunks that increase a steaming quality of the AR content based on the extracted information.

The information comprises quality information that is based on a size of the AR content and a level of detail (LOD), and a data size of the chunks.

The quality information may be a mean squared error (MSE) of an image that is rendered at an LOD of the chunks compared to an image that is rendered at a highest LOD.

The processor may be configured to determine the chunks to be requested based on the quality information, the data size, and a weight of the AR content.

The weight of the AR content may be determined based on a size by which the AR content is to be displayed.

The processor may be configured to render the AR content by combining the requested chunks with a previously received chunk.

The AR streaming apparatus may further include a camera, configured to capture an image; and a display device, configured to display the captured image and the AR content.

In a general aspect, a server includes a memory, configured to store a media presentation description (MPD)-augmented reality (AR) (MPD-AR) of at least one AR content, and progressive mesh chunks of the AR content; and a processor, configured to transmit an MPD-AR of a requested AR content in response to a first request from a terminal, and transmit a first progressive mesh chunk corresponding to a level of detail (LOD) requested by the terminal among the progressive mesh chunks of the requested AR content in response to a second request from the terminal.

The MPD-AR may include quality information based on a size of the AR content and an LOD, and a data size and a uniform resource locator (URL) of progressive mesh chunks corresponding to each LOD.

The quality information may be a mean squared error (MSE) of an image rendered at the LOD of the chunk compared to an image rendered at a highest LOD.

Other features and aspects will be apparent from the following detailed description, the drawings, and the claims.

Figure 1:
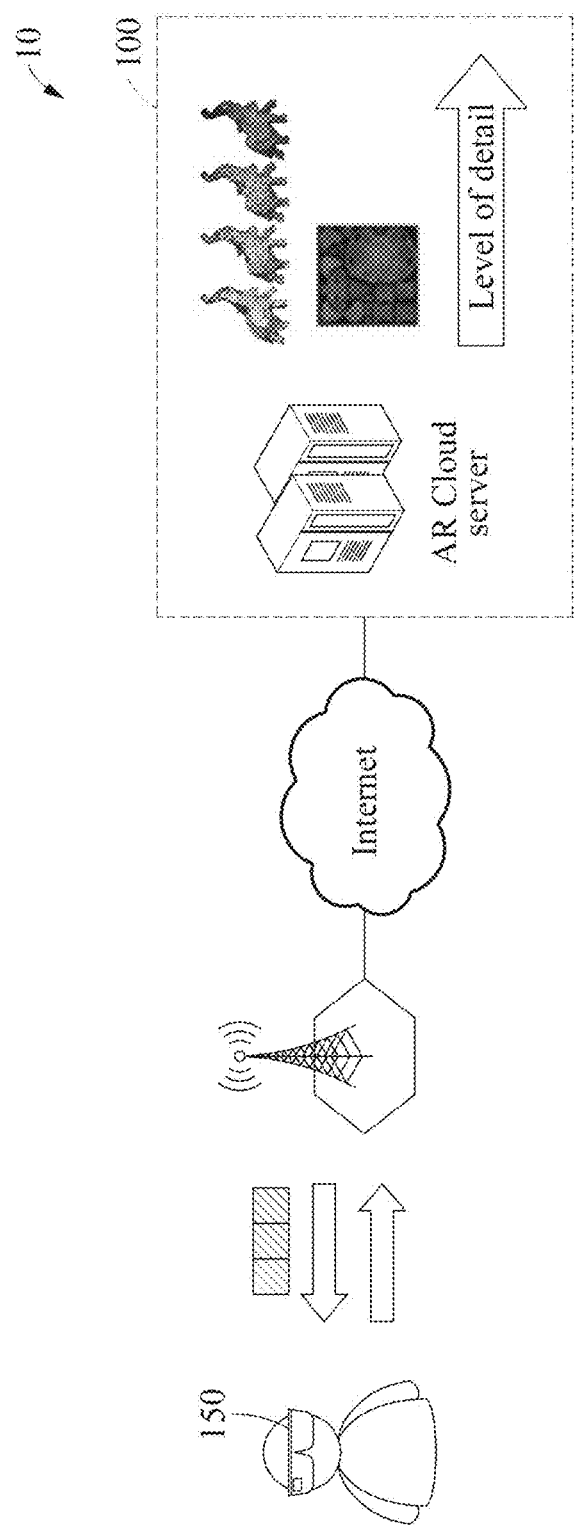
FIG. 1 illustrates an example augmented reality (AR) streaming system, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Figure 2:
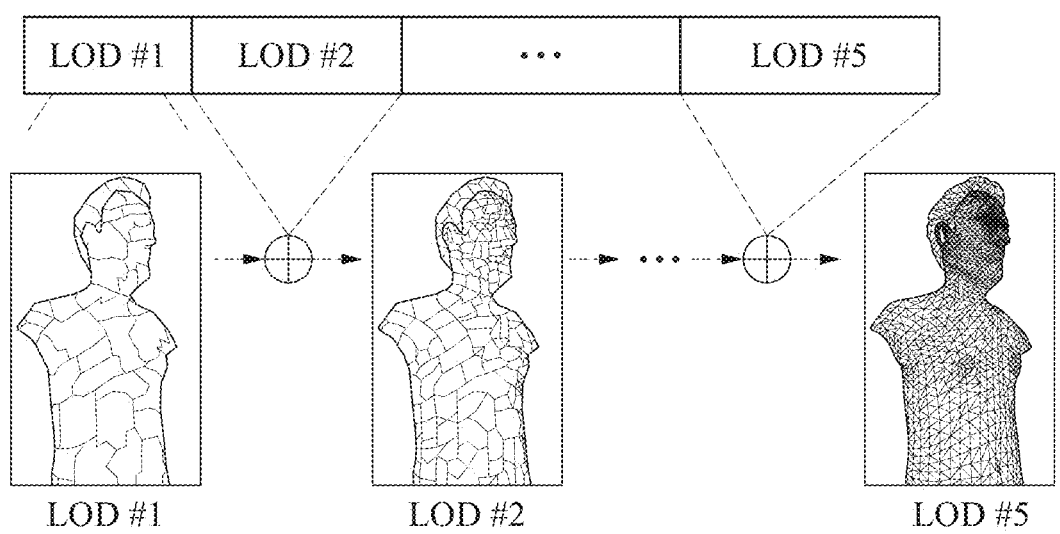
FIG. 2 illustrates an example of a progressive mesh implemented in the AR streaming system of FIG. 1.

FIG. 1 illustrates an example augmented reality (AR) streaming system, in accordance with one or more embodiments. FIG. 2 illustrates an example of a progressive mesh used in the AR streaming system of FIG. 1.

An AR streaming system 10 may provide AR streaming. The AR streaming system 10 may provide AR streaming of a high sensory quality through a low delay in an unstable communication network that changes over time. Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Referring to FIG. 1, the AR streaming system 10 includes a server 100 and an AR streaming apparatus 150.

The server 100 may provide an AR content to the AR streaming apparatus 150. The server 100 may transmit an AR content to the AR streaming apparatus 150 through a communication network. The server 100 may transmit an AR content to the AR streaming apparatus 150 connected to the Internet through a wireless communication network. In an example, the server 100 may be a cloud server that transmits AR contents through the Internet.

The server 100 may store therein AR contents. An AR content described herein may be, as a non-limiting example, a three-dimensional (3D) object consisting of a progressive mesh. The 3D object consisting of the progressive mesh may be generated with different levels of detail (LOD).

The server 100 may store chunks of a 3D object having different LOD. That is, the server 100 may store therein a plurality of chunks having different LOD from a low LOD to a high LOD for a single AR content.

A 3D object consisting of a progressive mesh may be rendered to be a 3D object that has a progressively higher precision as chunks of different LOD from a low LOD to a high LOD are combined. In an example, as illustrated in FIG. 2, a chunk of a low LOD (e.g., LOD #1) may be rendered as a 3D object with a low precision. In this example, when a chunk of LOD #2 higher than LOD #1 is combined, the precision of the 3D object to be rendered may increase. When a chunk of a highest LOD (e.g., LOD #5) is combined lastly, the 3D object having a highest precision may be rendered.

The server 100 may store a metafile of an AR content. The metafile may be a media presentation description (MPD)-AR (MPD-AR) in a form of an extensible markup language (XML) document that includes information associated with each AR content.

The AR streaming apparatus 150 may be, as a non-limiting example, a smart device that provides AR. The AR streaming apparatus 150 may be embodied by, for example, a smartphone, a tablet personal computer (PC), and a wearable device such as, for example, smart glasses, a smart contact lens, and a head-mounted display (HMD).

The AR streaming apparatus 150 may connect to the Internet through a wireless network and receive an AR content from the server 100. The AR streaming apparatus 150 may connect to the Internet using heterogeneous wireless networks simultaneously.

The AR streaming apparatus 150 may stream the AR content received from the server 100. The AR streaming apparatus 150 may display the AR content along with an image captured through a camera.

The AR streaming apparatus 150 may stream an AR content based on a marker detected in an image captured in real time. The AR streaming apparatus 150 may receive, from the server 100, an AR content corresponding to a detected marker, and stream the received AR content.

The AR streaming apparatus 150 may determine a priority of chunks to be received to improve a streaming quality based on a metafile of an AR content. The AR streaming apparatus 150 may preferentially request the server 100 for a chunk to provide high sensory quality streaming with a low delay based on a network state.

The AR streaming apparatus 150 may stream an AR content of a higher precision by combining a chunk of a low LOD and a chunk of a high LOD. In an example, the AR streaming apparatus 150 may render a 3D object having a higher LOD by combining a previously received chunk and a newly received chunk.

The AR streaming apparatus 150 may reuse a chunk of a low LOD and newly request only a chunk of a high LOD, and may thus prevent duplicated chunk transmission. Thus, it is possible to effectively use limited wireless network resources.

Figure 3:
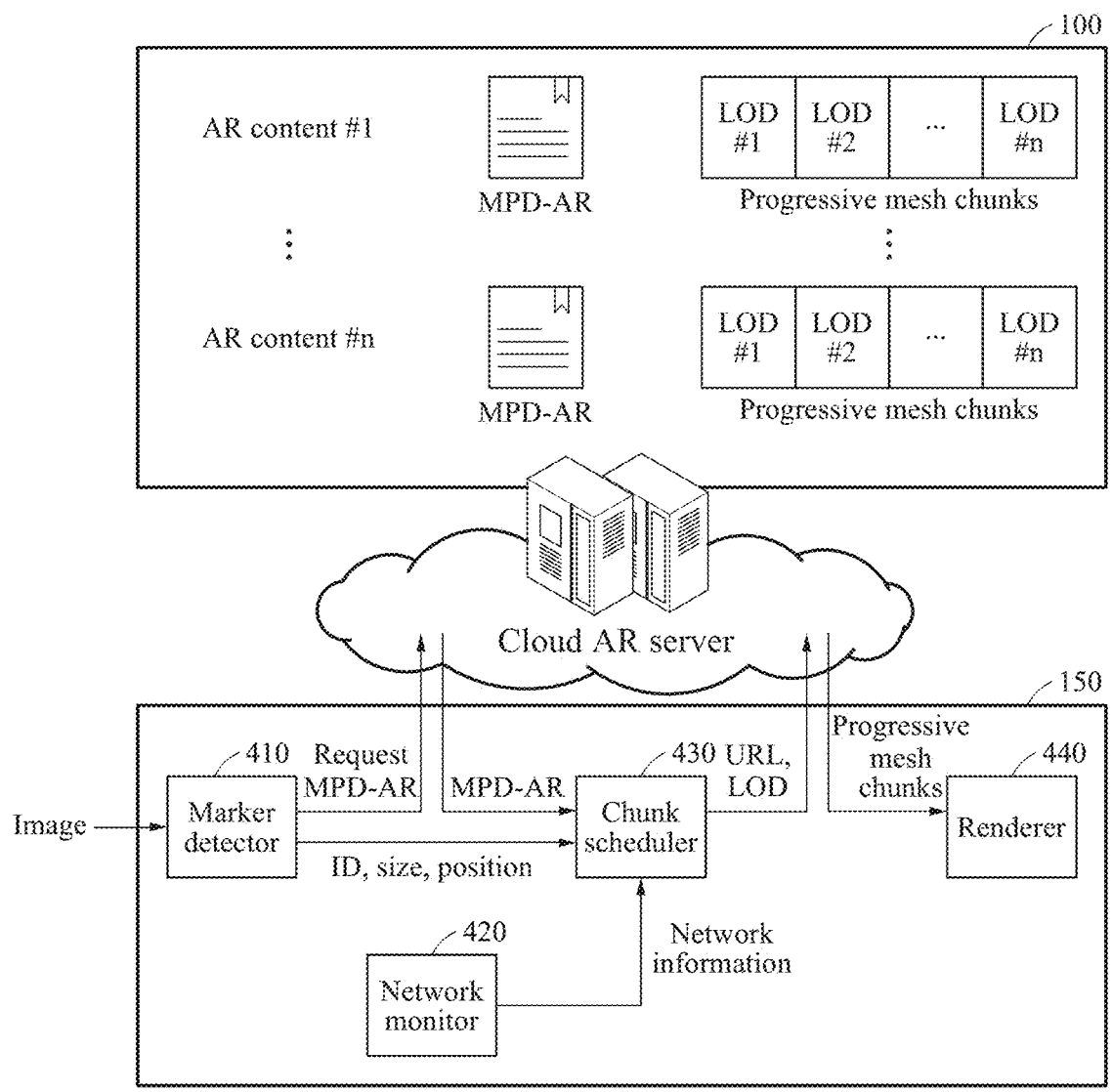
FIG. 3 illustrates an example of a configuration of the AR streaming system of FIG.
Figure 4:
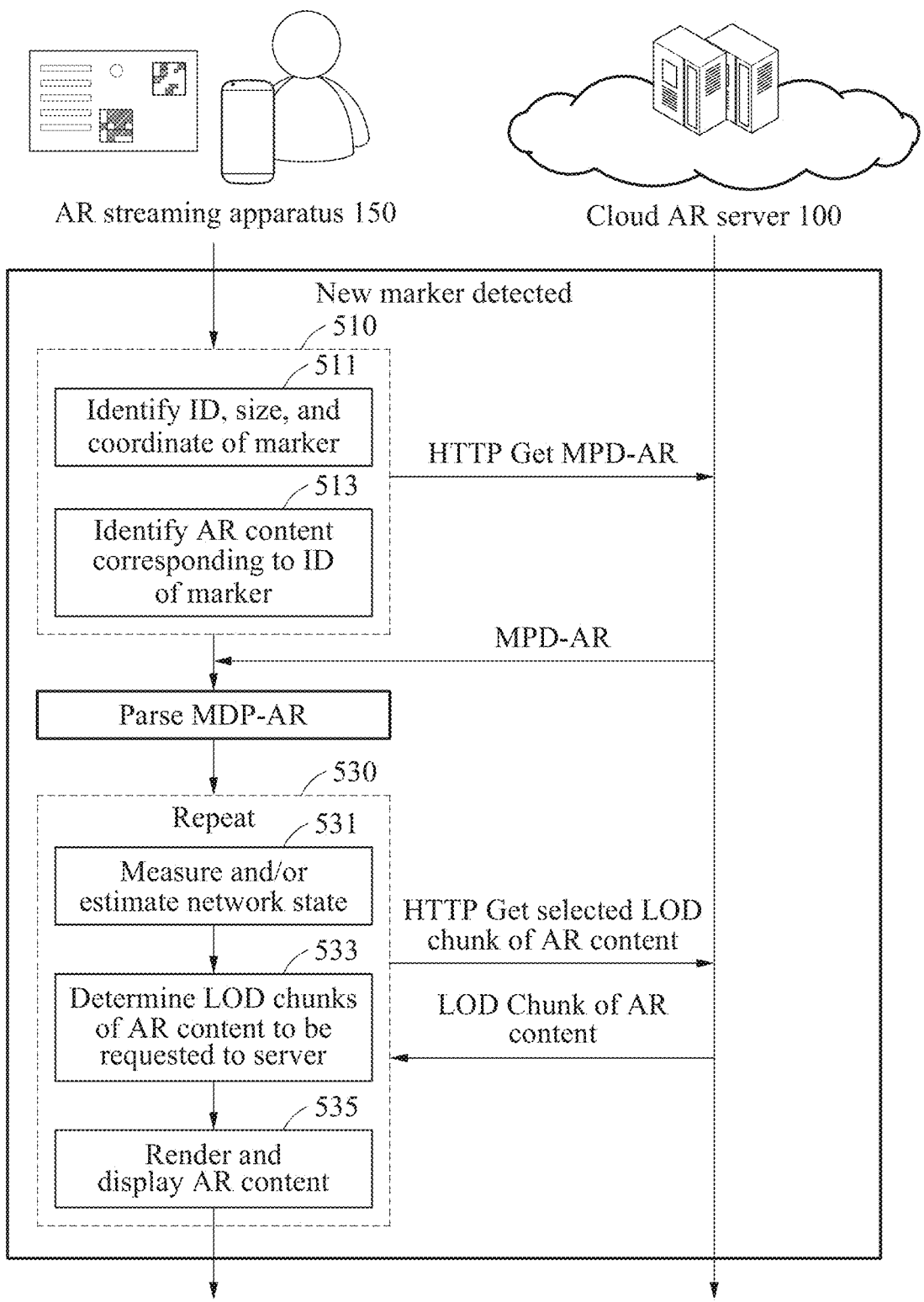
FIG. 4 illustrates an example of a flow of operations performed by the AR streaming system of FIG. 1.

FIG. 3 illustrates an example of a configuration of the AR streaming system 10 of FIG. 1. FIG. 4 illustrates an example of a flow of operations performed by the AR streaming system 10 of FIG. 1.

The server 100 may store a metafile (e.g., an MPD-AR) and progressive mesh chunks that correspond to an AR content. The progressive mesh chunks may include a plurality of chunks to render the AR content at a progressively higher LOD. In an example, the progressive mesh chunks include chunks corresponding to first to nth LOD.

The server 100 may store a metafile and progressive mesh chunks for each of a plurality of AR contents. In an example, the server 100 may store an MPD-AR and progressive mesh chunks of #1 through #n LOD for each of #1 through #n AR contents.

The server 100 may transmit a metafile of an AR content in response to a request from the AR streaming apparatus 150. The server 100 may transmit progressive mesh chunks in response to a request from the AR streaming apparatus 150. In an example, the server 100 may transmit progressive mesh chunks corresponding to an LOD requested by the AR streaming apparatus 150.

Referring to FIG. 3, the AR streaming apparatus 150 includes a marker detector 410, a network monitor 420, a chunk scheduler 430, and a renderer 440.

Referring to FIG. 4, in operation 510, the marker detector 410 detects a marker in an image captured in real time. In operation 511, the marker detector 410 detects an identifier (ID), a size, and a position of the marker in the image.

In operation 513, the marker detector 410 may identify an AR content corresponding to the ID of the marker. In an example, the marker detector 410 may recognize a uniform resource locator (URL) of the identified AR content, and request the server 100 to transmit a metafile of the AR content. The marker detector 410 may determine a size and a position by, and at which, the AR content is to be displayed on a display device based on the size and the position of the marker.

In an example, the marker detector 410 may detect a size $ma_i$ of a detected ith marker as represented by Equation 1 below. In Equation 1, $x_k^j$ and $y_k^j$ denote an x coordinate and a y coordinate of a kth vertex (e.g., first through fourth vertices may correspond to four vertices of a rectangular marker) of the ith marker.

$$ma_i = \frac{\sum_{k=2}^{3} |(x_k^i - x_1^i)(y_{k+1}^i - y_1^i) - (x_{k+1}^i - x_1^i)(y_k^i - y_1^i)|}{2} \quad \text{Equation 1}$$

The marker detector 410 may determine a size $s_i$ of an AR content based on a relative size of identified markers as represented by Equation 2. In Equation 2, $N_{AR}$ denotes the number of identified markers.

$$s_i = \frac{ma_i}{\sum_{j=1}^{N_{AR}} ma_j} \quad \text{Equation 2}$$

The marker detector 410 may quantize the size $s_i$ of the AR content to be $s_1^q, s_2^q, \ldots, s_{N_{AR}}^q$ based on Equations 3 and 4. denotes a quantized size of AR content #1 corresponding to an ith marker, and $S^{sup}$ denotes a set of quantized sizes of AR contents.

$$\vec{S}^q = (S_1^q, S_2^q, \ldots, S_{N_{AR}}^q) \quad \text{Equation 3}$$

$$S_i^q = \arg\min_{x \in S^{sup}} |S_i - X| \quad \text{Equation 4}$$

The network monitor 420 may continuously collect state information of a network to which the AR streaming apparatus 150 is connected.

In operation 530, the chunk scheduler 430 determines progressive mesh chunks to be preferentially requested to improve a streaming quality of the AR content.

In an example, the chunk scheduler 430 may collect information of the progressive mesh chunks that is included in the metafile by parsing the metafile of the AR content received from the server 100.

The chunk scheduler 430 may determine the progressive mesh chunks to be requested based on the collected information. In operation 533, the chunk scheduler 430 determines the progressive mesh chunks to be requested based on the information of the progressive mesh chunks, the size by which the AR content is to be displayed, and/or network state information.

In operation 535, the renderer 440 renders a 3D object based on the received progressive mesh chunks. In an example, the renderer 440 may render the 3D object by combining a previously received progressive mesh chunk and a newly received progressive mesh chunk.

The renderer 440 may perform the rendering using a progressive mesh chunk corresponding to a low LOD without waiting for all progressive mesh chunks included in an AR content to be received to reduce an initial delay time. The renderer 440 may render the AR content while gradually improving a sensory quality of the AR content by combining a progressive mesh chunk corresponding to a higher LOD that is to be received afterward.

The renderer 440 may display the rendered 3D object on the display device based on the size and the position of the marker.

Figure 5:
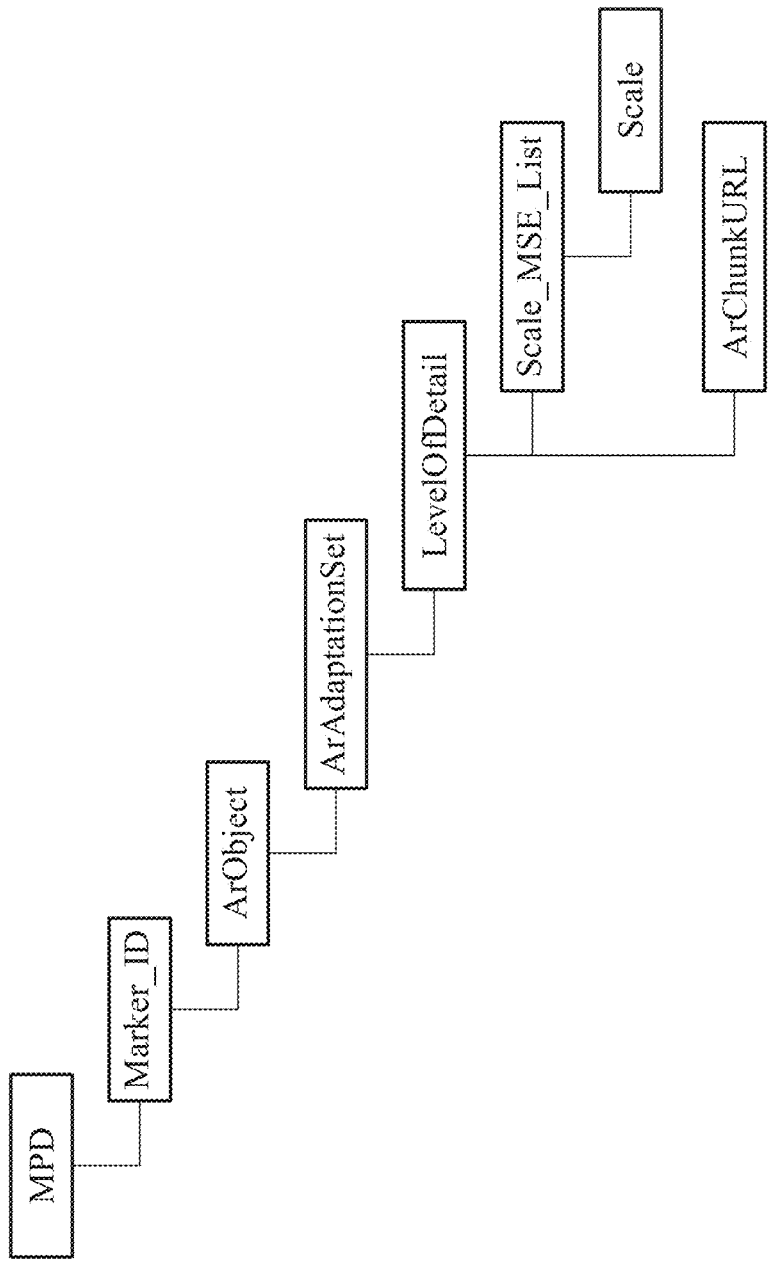
FIG. 5 illustrates an example of a metafile used in the AR streaming system of FIG.
Figure 6:
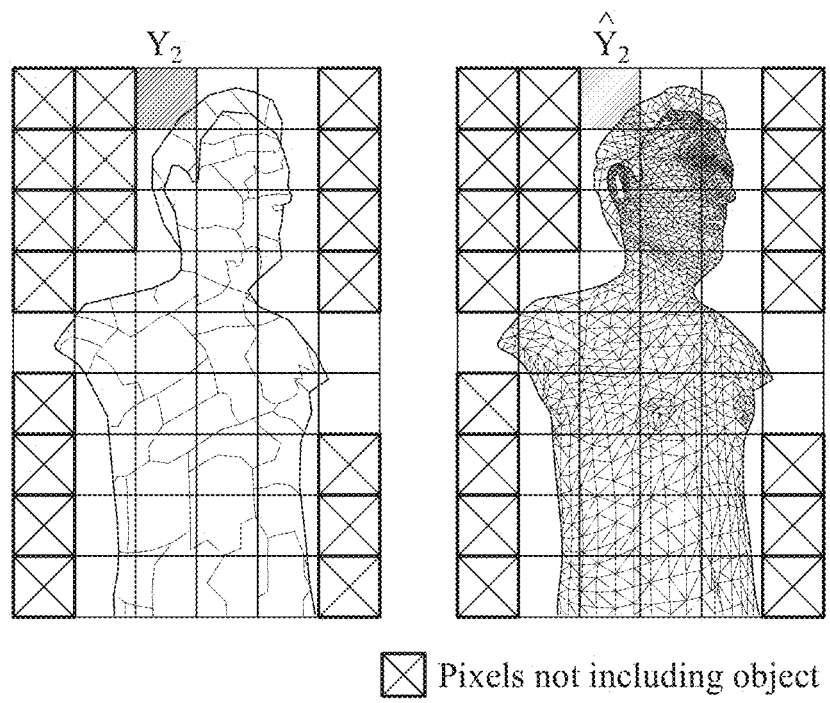
FIG. 6 illustrates an example of AR content quality information included in the metafile of FIG. 5.
Figure 7:
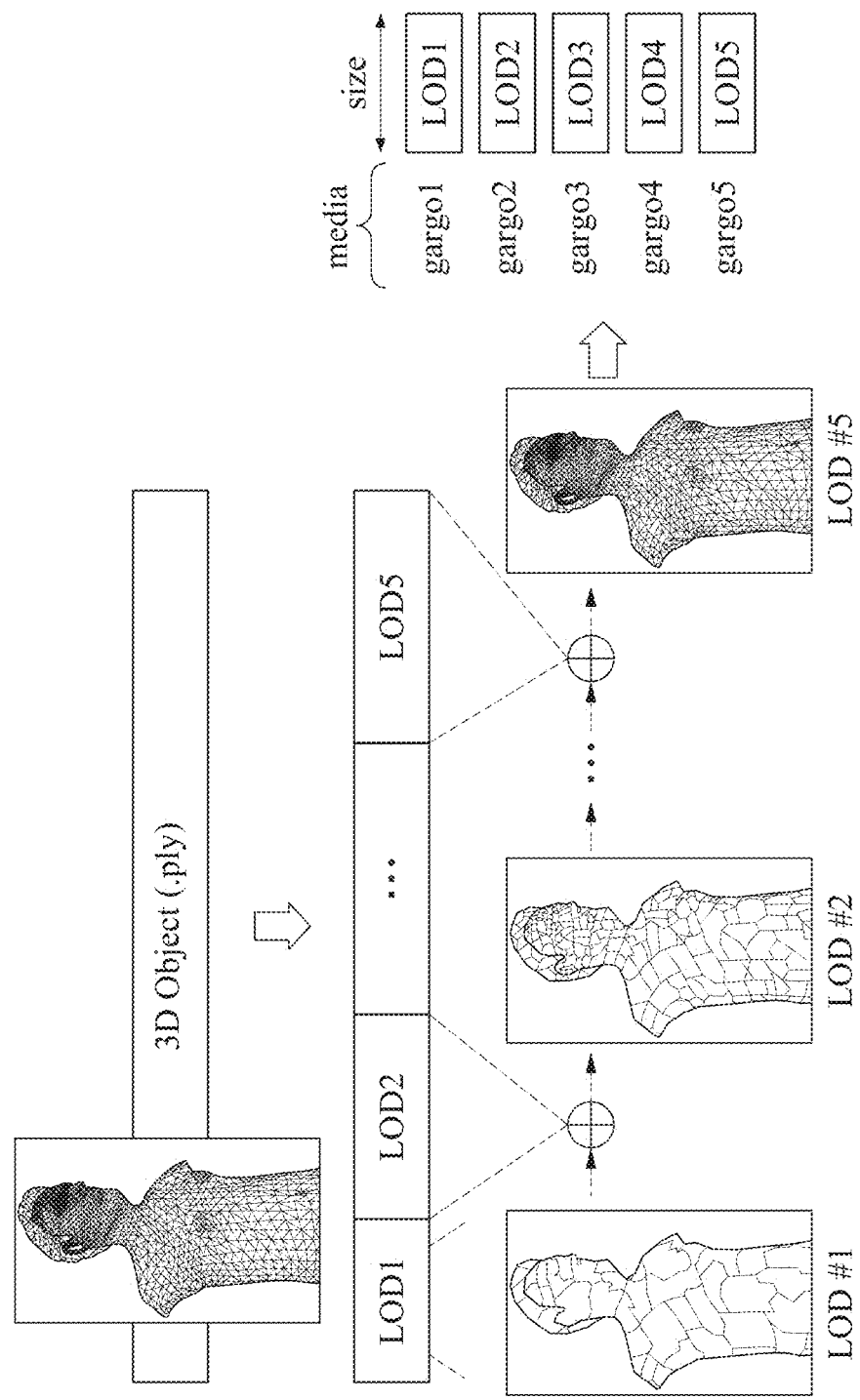
FIG. 7 illustrates an example of chunk information included in the metafile of FIG. 5.

FIG. 5 illustrates an example of a metafile implemented in the AR streaming system 10 of FIG. 1. FIG. 6 illustrates an example of AR content quality information included in the metafile of FIG. 5. FIG. 7 illustrates an example of chunk information included in the metafile of FIG. 5.

The server 100 may store a metafile corresponding to each AR content. The metafile may be an MPD-AR in a form of an XML document.

The MPD-AR may include information associated with progressive mesh chunks for streaming an AR content.

The MPD-AR may include Marker_ID as a highest layer. Marker_ID may indicate an ID of a marker corresponding to the AR content.

The MPD-AR may include ArObject as a second layer. ArObject may indicate a name of the AR content.

The MPD-AR may include ArAdaptationSet as a third layer. ArAdaptationSet may include information of selective progressive mesh chunks. ArAdaptationSet may include LevelOfDetail as a lower layer. In an example, ArAdaptationSet may include LevelOfDetail corresponding to each LOD.

LevelOfDetail may include Scale_MSE_List and ArChunkURL as lower layers that provide detailed information of progressive mesh chunks corresponding to each LOD.

Scale_MSE_List may include quality information of progressive mesh chunks based on a size (or scale) of the AR content. In an example, Scale_MSE_List may include quality information of progressive mesh chunks corresponding to a quantized size of each AR content. The size of the AR content and the quality information in Scale_MSE_List may be indicated as a tag in a lower layer.

The quality information may be a mean squared error (MSE) of an image rendered at each LOD compared to an image rendered at a highest LOD. In an example, the quality information, or the MSE, may be calculated based on a difference between a pixel value $\hat{Y}_i$ of an image rendered at a highest LOD and a pixel value $Y_i$ rendered at a different LOD, as represented by Equation 5. A pixel value of a pixel may represent a red, green, blue (RGB) value of the pixel. Here, pixels not including an object as illustrated in FIG. 6 may be excluded.

$$MSE = \frac{1}{n}\sum_{i=1}^{n}(Y_i - \hat{Y}_i)^2 \qquad \text{Equation 5}$$

ArChunkURL may include URLs and bytes of progressive mesh chunks corresponding to an LOD. In an example, as illustrated in FIG. 6, ArChunkURL may include URLs and bytes of progressive mesh chunks corresponding to each LOD.

Hereinafter, detailed operations of the chunk scheduler 430 will be described in association with information of progressive mesh chunks included in an MPD-AR.

The chunk scheduler 430 may perform scheduling on an order of receiving progressive mesh chunks based on a weighted MSE (WMSE) represented by Equation 6. The WMSE may be defined as a sensory quality of an AR content to be streamed.

$$WSME(\vec{s}^{q^*}) = \sum_{i=1}^{N_{AR}} \omega_i(\vec{s}^{q^*}) \cdot MSE_i \qquad \text{Equation 6}$$

In Equation 6, $\vec{s}^{q^s}$ denotes a scale vector of an AR content calculated as represented by Equation 3, and $\omega_i(\vec{s}^{q^s})$ denotes a weight of AR content #i. $MSE_i$ denotes an MSE of AR content #i to be streamed.

The chunk scheduler 430 may preferentially request a progressive mesh chunk that minimizes the WMSE. The chunk scheduler 430 may preferentially request a progressive mesh chunk of AR content #i that maximizes a cost function to be calculated as represented by Equation 7 and satisfies Equation 8.

$$\frac{\omega_i(\vec{s}^{q^*}) \cdot (MSE_i(s_i^{q^*}, l_i^{trans}) - MSE_i(s_i^{q^*}, l_i^{trans}+1))}{c_{i,l_i^{trans}+1}^{byte}} \qquad \text{Equation 7}$$

$$l_i^{trans} < L_i^{max} \qquad \text{Equation 8}$$

In Equation 8, $l_i^{trans}$ denotes an index of an LOD of the received progressive mesh chunk of AR content #i, and $L_i^{max}$ denotes a maximum LOD of progressive mesh chunks included in AR content #i. $c_{i,j}^{byte}$ denotes a size (byte) of a progressive mesh chunk of a jth LOD of AR content #i.

The scheduling may be performed by the chunk scheduler 430 as follows.

(1) Initialize all $l_i^{trans}$ to 00. Obtain an MSE value $MSE_j$ (for $1 \le i \le N_{AR}$) based on a size of an AR content and an LOD by parsing an MPD-AR received from the server 100, a size $c_{i,j}^{byte}$ (for $1 \le i \le N_{AR}$ and $1 \le j \le L_i^{max}$) of each progressive mesh chunk, and a URL of each progressive mesh chunk. Also, obtain a size $$r_s^{q*}$$

by which each AR content is to be displayed from the marker detector 410.

(2) Determine AR content #i that minimizes a cost function, and request a progressive mesh chunk of $l_i^{trans}+1$th LOD for AR content #i.

(3) Receive the requested progressive mesh chunk, and then update $l_i^{trans}$ to $l_i^{trans}+1$.

(4) Repeat (2) and (3) until all progressive mesh chunks of all AR contents are received.

Figure 8:
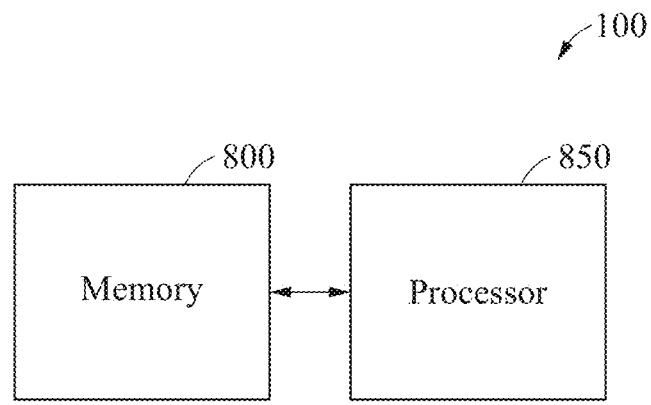
FIG. 8 illustrates an example of a server illustrated in FIG. 1.
Figure 9:
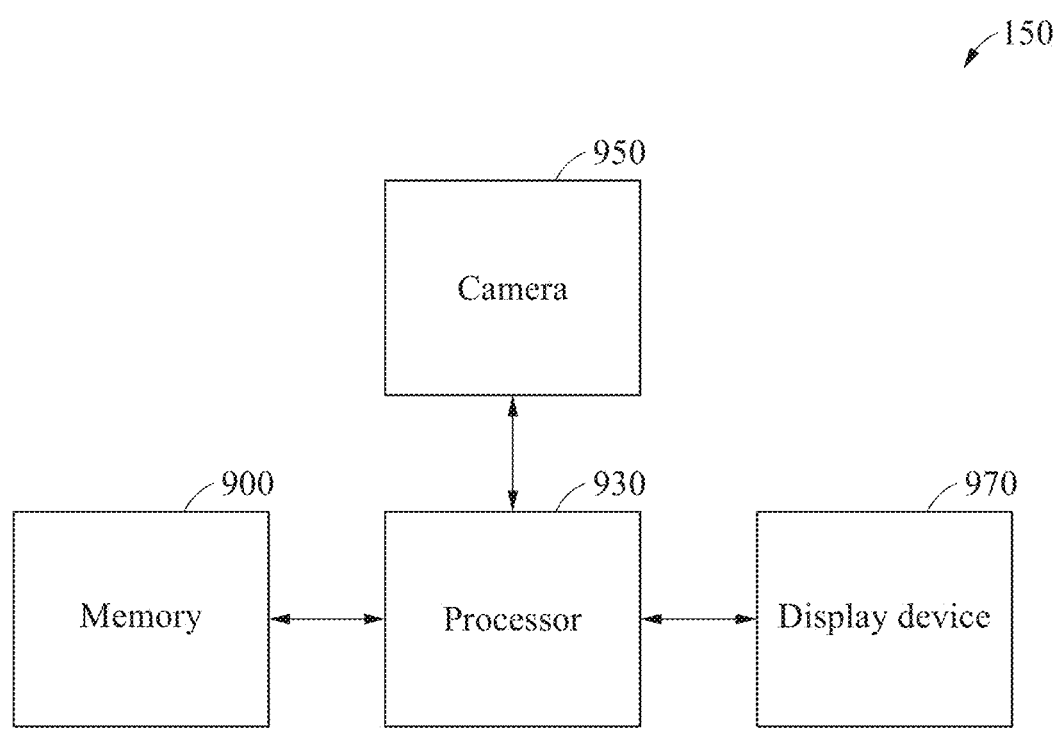
FIG. 9 illustrates an example of an AR streaming apparatus illustrated in FIG. 1.

FIG. 8 illustrates an example of the server 100 illustrated in FIG. 1. FIG. 9 illustrates an example of the AR streaming apparatus 150 illustrated in FIG. 1.

Referring to FIG. 8, the server 100 includes a memory 800 and a processor 850. The operations of the server 100 described above may be performed through the processor 850, and a metafile and progressive mesh chunks of an AR content may be stored in the memory 800.

Referring to FIG. 9, the AR streaming apparatus 150 includes a memory 900, a processor 930, a camera 950, and a display device 970.

The operations of the marker detector 410, the network monitor 420, the chunk scheduler 430, and the renderer 440 described above with reference to FIG. 4 may be performed through the processor 930. That is, the marker detector 410, the network monitor 420, the chunk scheduler 430, and the renderer 440 may be construed as being components that are classified from the operations performed by the processor 930 by function, for the convenience of description. In such an example, the processor 930 may be hardware including a plurality of processors.

The camera 950 may capture an image in real time. In an example, the camera 950 may obtain an image of an area in which an AR content is to be streamed.

The display device 970 may display an AR content. The display device 970 may display an AR content by combining a rendered AR content with an image captured in real time.

The processor 850 or the processor 930 may execute a computer-readable code (e.g., software) stored in the memory 800 or the memory 900, and may execute instructions induced by the processor 850 or the processor 930.

The processor 850 or the processor 930 may be a data processing device embodied by hardware having a circuit of a physical structure to execute desired operations. The desired operations may include, for example, a code or instructions included in a program.

The data processing device embodied by hardware may include, for example, a microprocessor, a central processing unit (CPU), a processor core, a multi-core processor, a multiprocessor, an application-specific integrated circuit (ASIC), and a field-programmable gate array (FPGA).

The memory 800 or the memory 900 may store therein the instructions (or the program) executable by the processor 850 or the processor 930. In an example, the instructions may include instructions for performing operations of the processor 850 or the processor 930 and/or operations of components of the processor 850 or the processor 930.

The memory 800 or the memory 900 may be embodied by a volatile or nonvolatile memory device.

The volatile memory device may be embodied as, for example, a dynamic random-access memory (DRAM), a static RAM (SRAM), a thyristor RAM (T-RAM), a zero-capacitor RAM (Z-RAM), or a twin-transistor RAM (TTRAM).

The nonvolatile memory device may be embodied as, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

The AR streaming apparatus 150, server 100, memory 800, processor 850, camera 950, memory 900, processor 930, display device 970, other apparatuses, devices, units, modules, and components described herein with respect to FIGS. 1-9 are implemented by, or representative of, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An augmented reality (AR) streaming method, comprising:
   identifying an AR content to be displayed;
   obtaining a metafile corresponding to the AR content;
   extracting, from the metafile, information of chunks, each having different level of details (LODs), to render the AR content;
   determining priorities of the chunks based on the extracted information of the chunks including weighted data associated with a difference between a pixel value rendered at a highest LOD, of the LODs, and a pixel value rendered at other different LODs, of the LODs;
   requesting the chunks based on the determined priorities of the chunks; and
   rendering the AR content based on the chunks, while receiving the chunks, each having the different level of details.

2. The AR streaming method of claim 1, wherein the identifying of the AR content comprises:
   detecting a marker in a captured image;
   recognizing a uniform resource locator (URL) of the AR content based on an identifier of the detected marker; and
   determining a position and a size at and by which the AR content is to be displayed based on a position of the detected marker and a size of the detected marker.

3. The AR streaming method of claim 1, wherein the requesting of the chunks comprises:
   requesting the chunks that increase a streaming quality of the AR content based on the extracted information.

4. The AR streaming method of claim 1, wherein the information comprises quality information that is based on a size of the AR content and a level of detail (LOD), and a data size of the chunks.

5. The AR streaming method of claim 4, wherein the quality information is a mean squared error (MSE) of an image that is rendered at an LOD of the chunks compared to an image that is rendered at a highest LOD.

6. The AR streaming method of claim 4, wherein the requesting of the chunks comprises:

determining the chunks to be requested based on the quality information, the data size, and a weight of the AR content.

7. The AR streaming method of claim 6, wherein the weight of the AR content is determined based on a size by which the AR content is to be displayed.

8. The AR streaming method of claim 1, wherein the rendering of the AR content comprises:
rendering the AR content by combining the requested chunks with a previously received chunk.

9. An augmented reality (AR) streaming apparatus, comprising:
a memory comprising instructions; and
a processor, configured to execute the instructions,
wherein, when the instructions are executed by the processor, the processor is configured to:
identify an AR content to be displayed;
obtain a metafile corresponding to the AR content;
extract, from the metafile, information of chunks, each having different level of details (LODs), to render the AR content;
determine priorities of the chunks based on the extracted information of the chunks including weighted data associated with a difference between a pixel value rendered at a highest LOD, of the LODs, and a pixel value rendered at other different LODs, of the LODs;
request the chunks based on the determined priorities of the chunks; and
render the AR content based on the chunks, while receiving the chunks, each having the different level of details.

10. The AR streaming apparatus of claim 9, wherein the processor is configured to:
detect a marker in a captured image;
recognize a uniform resource locator (URL) of the AR content based on an identifier of the detected marker; and
determine a position and a size at and by which the AR content is to be displayed based on a position of the detected marker and a size of the detected marker.

11. The AR streaming apparatus of claim 9, wherein the processor is configured to:
request the chunks that increase a steaming quality of the AR content based on the extracted information.

12. The AR streaming apparatus of claim 9, wherein the information comprises quality information that is based on a size of the AR content and a level of detail (LOD), and a data size of the chunks.

13. The AR streaming apparatus of claim 12, wherein the quality information is a mean squared error (MSE) of an image that is rendered at an LOD of the chunks compared to an image that is rendered at a highest LOD.

14. The AR streaming apparatus of claim 12, wherein the processor is configured to:
determine the chunks to be requested based on the quality information, the data size, and a weight of the AR content.

15. The AR streaming apparatus of claim 14, wherein the weight of the AR content is determined based on a size by which the AR content is to be displayed.

16. The AR streaming apparatus of claim 9, wherein the processor is configured to:
render the AR content by combining the requested chunks with a previously received chunk.

17. The AR streaming apparatus of claim 9, further comprising:
a camera, configured to capture an image; and
a display device, configured to display the captured image and the AR content.

18. A server, comprising:
a memory, configured to store a media presentation description (MPD)-augmented reality (AR) (MPD-AR) of at least one AR content, and progressive mesh chunks of the AR content; and
a processor, configured to transmit an MPD-AR of a requested AR content in response to a first request from a terminal, and transmit a first progressive mesh chunk corresponding to a level of detail (LOD) requested, based on priorities of the progressive mesh chunks, by the terminal among the progressive mesh chunks of the requested AR content in response to a second request from the terminal,
wherein the AR content is rendered when the first progressive mesh chunk is received and the AR content is progressively rendered while additional progressive mesh chunks, each having different level of details (LODs), are progressively received, and
wherein the priorities of the progressive mesh chunks are determined based on extracted information including weighted data associated with a difference between a pixel value rendered at a highest LOD, of the LODs, and a pixel value rendered at other different LODs, of the LODs.

19. The server of claim 18, wherein the MPD-AR comprises quality information based on a size of the AR content and an LOD, and a data size and a uniform resource locator (URL) of progressive mesh chunks corresponding to each LOD.

20. The server of claim 19, wherein the quality information is a mean squared error (MSE) of an image rendered at the LOD of the chunk compared to an image rendered at a highest LOD.

* * * * *